(12) United States Patent
Ma

(10) Patent No.: US 7,013,272 B2
(45) Date of Patent: Mar. 14, 2006

(54) AMPLITUDE MASKING OF SPECTRA FOR SPEECH RECOGNITION METHOD AND APPARATUS

(75) Inventor: Changxue Ma, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 292 days.

(21) Appl. No.: 10/218,548

(22) Filed: Aug. 14, 2002

(65) Prior Publication Data

US 2004/0034526 A1 Feb. 19, 2004

(51) Int. Cl.
*G10L 15/05* (2006.01)
*G10L 21/02* (2006.01)

(52) U.S. Cl. ................................. 704/227; 704/243
(58) Field of Classification Search ................. 704/227, 704/243, 200.1, 205
See application file for complete search history.

(56) References Cited

U.S. PATENT DOCUMENTS

| 4,905,286 A | 2/1990 | Sedgwick et al. |
| 5,355,431 A | 10/1994 | Kane et al. |
| 5,550,924 A | 8/1996 | Helf et al. |
| 6,067,515 A * | 5/2000 | Cong et al. ................. 704/243 |
| 2002/0116177 A1 * | 8/2002 | Bu et al. ................. 704/200.1 |

OTHER PUBLICATIONS

"The IEEE Standard Dictionary of Electrical and Electronic Terms," Sixth Ed., Dec. 1996, pp. 408-409, 585. 696.*

* cited by examiner

*Primary Examiner*—Richemond Dorvil
*Assistant Examiner*—Donald L. Storm
(74) *Attorney, Agent, or Firm*—Fitch, Even, Tabin & Flannery

(57) ABSTRACT

In a speech recognition platform, a masking unit 17 can be utilized to mask noisy content within an audio sample. By masking such noise in a dynamic but predictable manner, valid content can be preserved while largely overcoming the random and detrimental presence of noise. In one embodiment, speech recognition features are extracted pursuant to a hierarchical process that localizes, at least to some extent, some of the resultant features from other resultant features. As a result, noisy or otherwise unreliable information corresponding to the audio sample will not be leveraged unduly across the entire feature set. In another embodiment, an average energy value for processed samples is calculated with individual energy values that are downwardly weighted when such individual energy values are likely representative of noise.

20 Claims, 3 Drawing Sheets

AMPLITUDE MASKING OF SPECTRA FOR SPEECH RECOGNITION METHOD AND APPARATUS

TECHNICAL FIELD

This invention relates generally to speech recognition and more particularly to the facilitation of speech recognition in the presence of ambient noise.

BACKGROUND

Speech recognition is generally well understood in the art. Generally speaking, audio samples (which may or may not contain actual speech) are digitized to facilitate digital processing. Various speech recognition features (such as, for example, cepstral coefficients) are extracted from the digitized audio samples and at least some of these features are used in a pattern matching process to facilitate recognition of any speech content that may be contained in the audio samples.

Many prior art speech recognition approaches work relatively successfully in a laboratory setting where little or no ambient noise exists. Unfortunately, when used during more normal operating conditions, and particularly when used where audible ambient noise (i.e., non-speech content) exists, the performance of such approaches frequently suffers greatly. As a result, recognition reliability can drop considerably.

To attempt to mitigate the impact on recognition of such noise, many prior art suggestions revolve about trying to suppress the noise content before extracting the speech recognition features and/or conducting the pattern matching. So-called Wiener filtering and spectral subtraction, for example, seek to estimate the noise contribution (at least within the power spectrum) and to then effectively subtract that contribution from the sample.

Such approaches tend to treat noise as a relatively simple phenomena (for example, these prior art techniques usually assume that noise is stationary over at least short periods of time and further assume that noise constitutes a purely additive component of the final audio sample) when, more usually, noise behaves in more complicated and unpredictable ways. As a result, the effectiveness of such prior art approaches can vary considerably (and often unpredictably) from moment to moment, platform to platform, and environment to environment.

In general, the contribution of ambient noise continues to comprise a stubborn and significant known problem that acutely impacts the reliability of most or all speech recognition techniques.

Another prior art problem stems from the speech recognition feature extraction process itself. In general, many such techniques process the spectral content of the audio sample in a way that permits noisy or otherwise unreliable content in a small portion of the sample to ultimately influence the accuracy of most or even all of the resultant extracted features. For example, the cosine transformation that characterizes the extraction of cepstral coefficients readily translates noisy errors in a small portion of the sample throughout all of the corresponding coefficients for that sample.

BRIEF DESCRIPTION OF THE DRAWINGS

The above needs are at least partially met through provision of the speech recognition facilitation method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, speech recognition features are extracted from an audio sample. In one embodiment, masking information (derived as a function, at least in part, of the amplitude of spectral domain information for the audio sample) is used to mask noise in the spectral domain representation of the audio sample prior to such feature extraction. As a result, noise content, rather than being ineffectually subtracted or removed with a resultant unreliable and unpredictable result, is instead overcome with an overpowering, but utterly predictable, masking contribution. Because the masking contribution is so predictable, the follow-on pattern matching activity can compensate accordingly. As a result, the presence or absence of noise becomes largely irrelevant.

In another embodiment, extraction of speech recognition features includes obtaining localized speech recognition coefficients wherein at least some of the localized speech recognition coefficients are determined independent of other of the speech recognition coefficients Such localized processing avoids propagating the existence or impact of noisy errors in a portion of the sample throughout the sample generally. In one embodiment, substantially half the localized speech recognition coefficients are determined independently of the remaining localized speech recognition coefficients. If desired, additional partitioning can be effected pursuant to a similar hierarchical approach to achieve the desired number of resultant localized speech recognition coefficients.

In yet another embodiment, an energy value representing energy of the sample is derived by downwardly scaling energy amplitude levels for amplitude levels that fall below a predetermined threshold prior to averaging such amplitude levels. In one embodiment, the predetermined threshold represents, at least in part, an average noise level plus an amount that corresponds to peak variations in the noise content.

Figure 1:
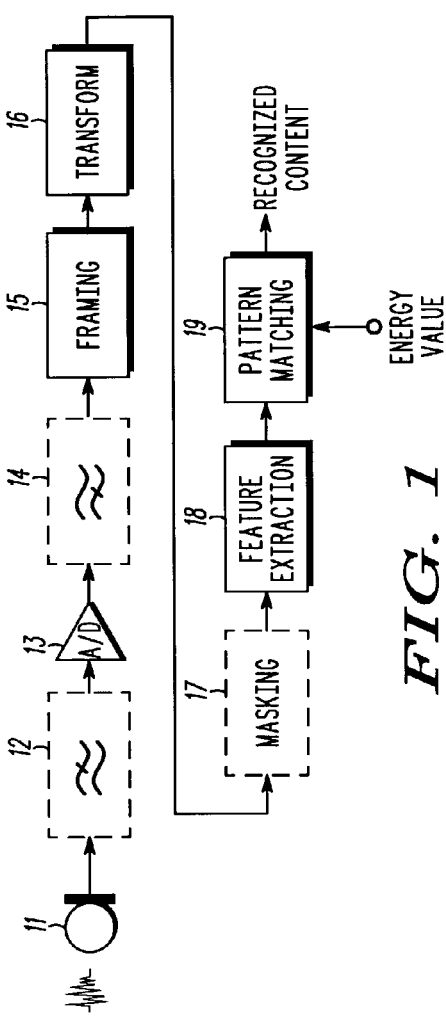
FIG. 1 comprises a block diagram of a speech recognition platform as configured in accordance with various embodiments of the invention.

Referring now to FIG. 1, various embodiments of a speech recognition platform will be described. It will be apparent to those skilled in the art that many of the functions described can be effected in a variety of ways, including through use of discrete circuitry, hard-wired logic, and any of a variety of soft-programmable devices including microprocessors, digital signal processors, and programmable gate arrays.

A microphone 11 responds to an audible signal and transduces the physical vibrations constituting the audible signal into corresponding electric signals as well understood in the art. In a preferred embodiment, the resultant signal then passes through a low pass filter 12 that serves to limit the frequency range of the signal and hence facilitate subsequent sampling within Nyquist-compliant limits. Also in a preferred embodiment, an analog-to-digital converter 13 then digitizes the signal to facilitate subsequent processing within the digital domain. As an illustration, presuming that the low pass filtered signal has a frequency range of 4 kHz, the analog-to-digital converter 13 will typically produce satisfactory results with a sampling rate of 8 kHz.

In a preferred embodiment, a pre-emphasis filter 14 will then be used to emphasize at least portions of the higher frequency content of the signal as well understood in the art. A framing unit 15 will then be used to parse a predetermined quantity of signal bits representing the signal into frames of predetermined length. For example, a frame size of 25 milliseconds will serve well for many applications. Each resultant frame will then be transformed in a transform unit 16. In a preferred embodiment, the transform unit 16 serves to effect a fast Fourier transform as is typical to many speech recognition applications. Such a transform serves, at least in part, to translate the audio signal information into a spectral domain representation (as versus, for example, a temporal representation).

In one embodiment, a masking unit 17 processes the spectral representation of the audio signal in a predetermined way to effect the addition of masking information to at least some valleys in the spectral representation. In a preferred embodiment, a non-linear filter serves to add such masking information as a function, at least in part, of the spectral amplitude on either side of the valleys to be masked.

Figure 2:
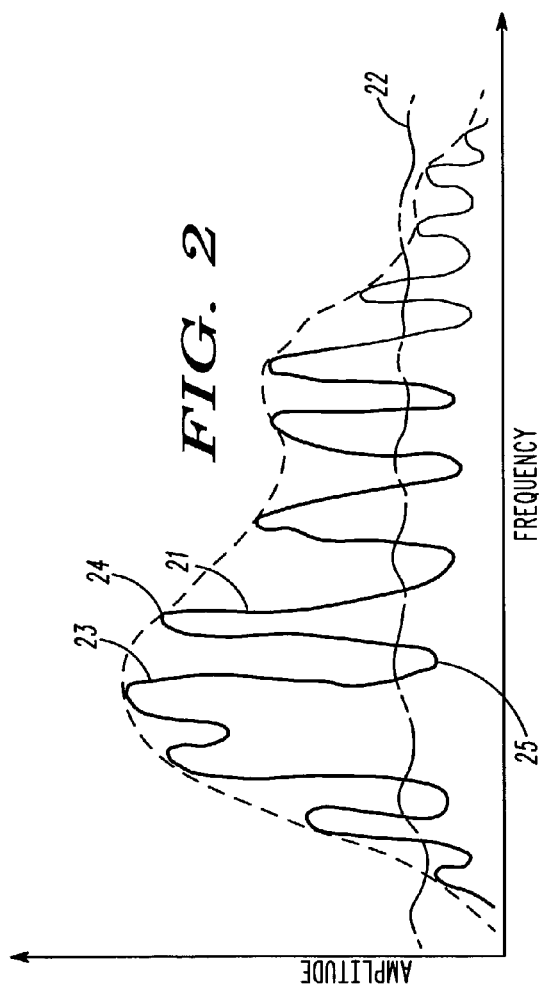
FIG. 2 comprises a graph depicting a spectral domain view of a given audio sample as configured in accordance with an embodiment of the invention.

For example, with momentary reference to FIG. 2, it can be seen that the spectral representation 21 as corresponds to a given frame of audio information is typically characterized by peaks (such as the peaks denoted by reference numerals 23 and 24) and valleys (such as the valley denoted by the reference numeral 25). While the peaks 23 and 24 will usually rise above a noise level 22 as may be present in the original audio signal, at least some of the valleys 25 may drop below this noise level 22. As a result, the information content represented by such deep valleys 25 is essentially lost due to occlusion by the noise.

Figure 3:
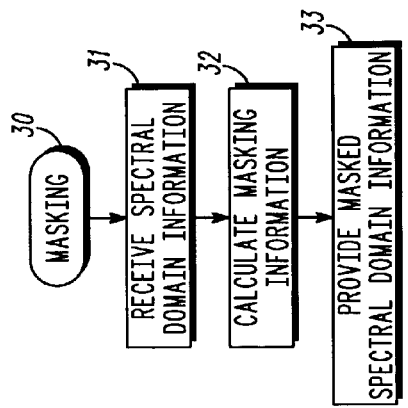
FIG. 3 comprises a flow diagram as configured in accordance with an embodiment of the invention.
Figure 4:
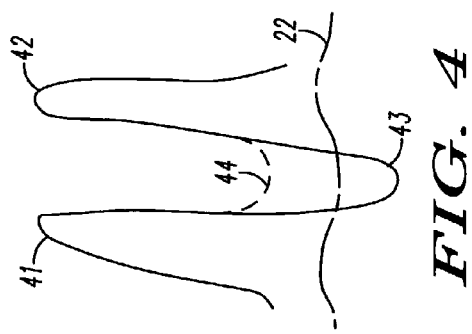
FIG. 4 comprises a detailed view of a portion of a spectral domain view of a given audio sample with noise masking as configured in accordance with an embodiment of the invention.

With momentary reference now to FIG. 3, a masking process 30 can generally provide for reception 31 of such spectral domain information and a subsequent calculation 32 of masking information that is then provided 33 for use in masking the noise level in such circumstances. To illustrate this approach, FIG. 4 depicts a valley 43 positioned between two adjacent peaks 41 and 42. The peak levels are used, at least in part, to derive masking information that, when added to the valley 43, yields a new valley floor 44. The new valley floor 44, being higher than the noise level 22, may now be processed in an ordinary fashion with excellent essentially noise-free results.

A non-linear filtering technique is used in a preferred embodiment to accomplish such masking of the deep valleys in the speech spectra as a function, at least in part, of neighboring harmonics. Such a non-linear filter may be described as follows:

$$y_n = \alpha y_{n-1} + x_n$$

$$\alpha = \begin{cases} c_1, \text{if } y_n > x_n \\ c_2, \text{if } y_n <= x_n \end{cases}$$

where y represents the spectral amplitude at a given frequency n, x represents the input of the spectral amplitude at the given frequency n, and c1 and c2 are constants selected to accommodate the particular context and needs of a given application. (Note that this filter can be applied bi-directionally, meaning that one can move from a lower to a higher frequency or vice versa.) For example, c1 can be 0.9 and c2 can be 0.1.

So configured, the masking unit 17 will effectively alter the audio information in a dynamic but highly predictable fashion. The audio information will tend to be altered in a way that leaves relatively higher signal amplitudes untouched and relatively lower signal amplitudes increased in amplitude such that most or all of any audio noise as might be present in the original audio sample is masked. By training the pattern recognition portion of the speech recognizer to cooperate accordingly (such as, for example, by storing representative patterns for given speech samples that are themselves processed with a similar noise masking technique), the presence of ambient noise in the original audio input can be greatly or wholly mitigated. Importantly, this improved performance can be attained with little additional computational overhead requirements and/or corresponding current drain (with both of these performance criteria being often particularly important in portable platforms that rely upon portable power supplies such as batteries).

Figure 5:
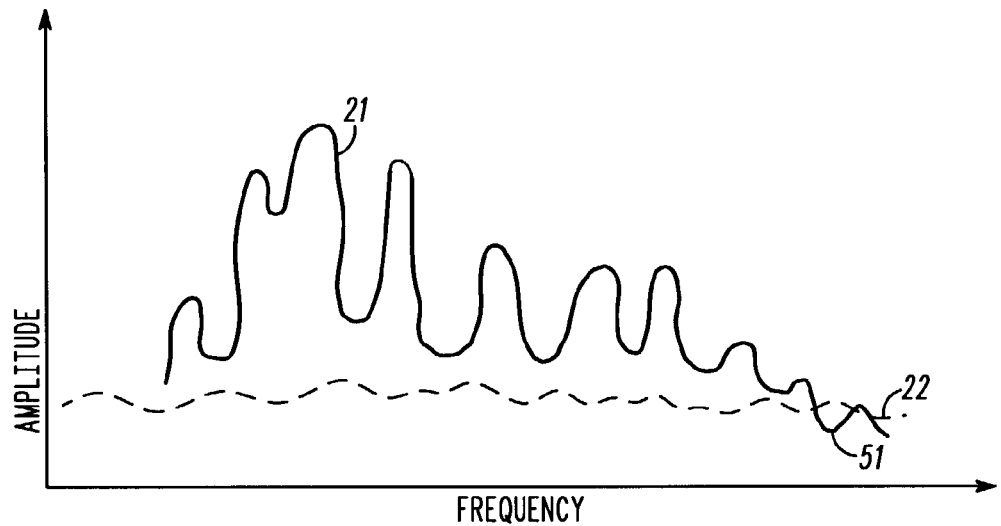
FIG. 5 comprises a graph depicting a spectral domain view of a given audio sample as configured in accordance with an embodiment of the invention.

Referring back to FIG. 1, the transformed representation of the audio information (with or without noise masking as described above) then passes to a feature extraction unit 18 of choice as well understood in the art. Such a feature extraction unit 18 serves to extract at least some speech recognition features from the modified audio information. For example, in one embodiment, speech recognition features such as cepstral coefficients can be extracted as well understood in the art. Many such feature extraction techniques, however, including cepstral coefficient extraction, often serve to propagate or otherwise unduly leverage the existence of a small quantity of unreliable information across all or most of the extracted features. For example, with reference to FIG. 5, though only a small portion 51 of a spectral representation 21 of a transformed audio sample may fall below an ambient noise level 22, the existence of this relatively small noise contribution in a relatively limited portion of the spectral representation 21 will nevertheless negatively impact the calculation of all resultant cepstral coefficients due, at least in part, to the cosine analysis that partially characterizes such a technique.

To avoid this problem, in a preferred embodiment, a hierarchically-based analysis will yield speech recognition features comprising substantially localized speech recognition coefficients. In particular, at least some of the localized speech recognition coefficients are determined independently of at least some of the other speech recognition coefficients. By localizing the process in this way, unreliable information in one part of the audio signal representation will not necessarily negatively impact in any way the extraction of reliable features from other parts of the audio signal representation.

Figure 6:
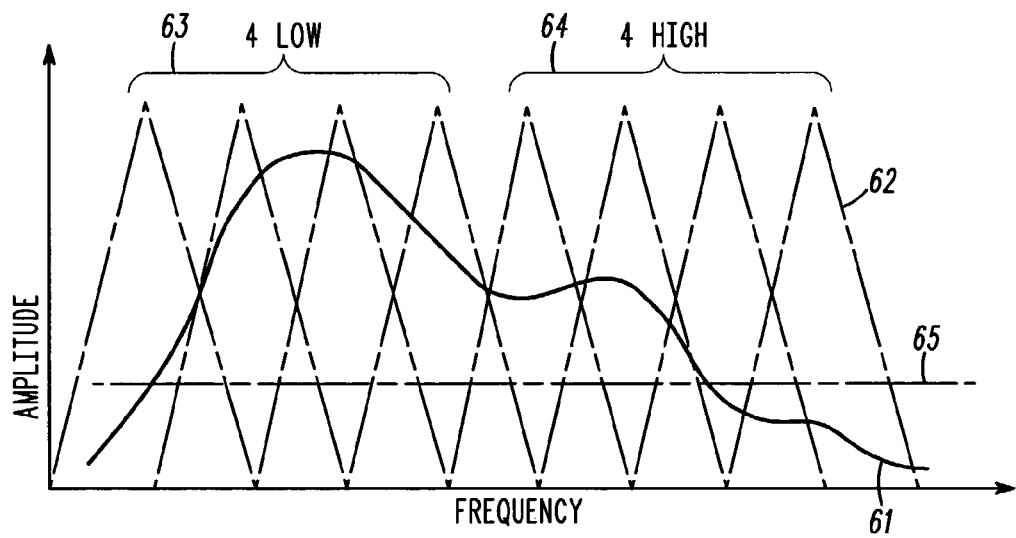
FIG. 6 comprises a modified spectral domain view of a given audio sample as configured in accordance with an embodiment of the invention.
Figure 7:
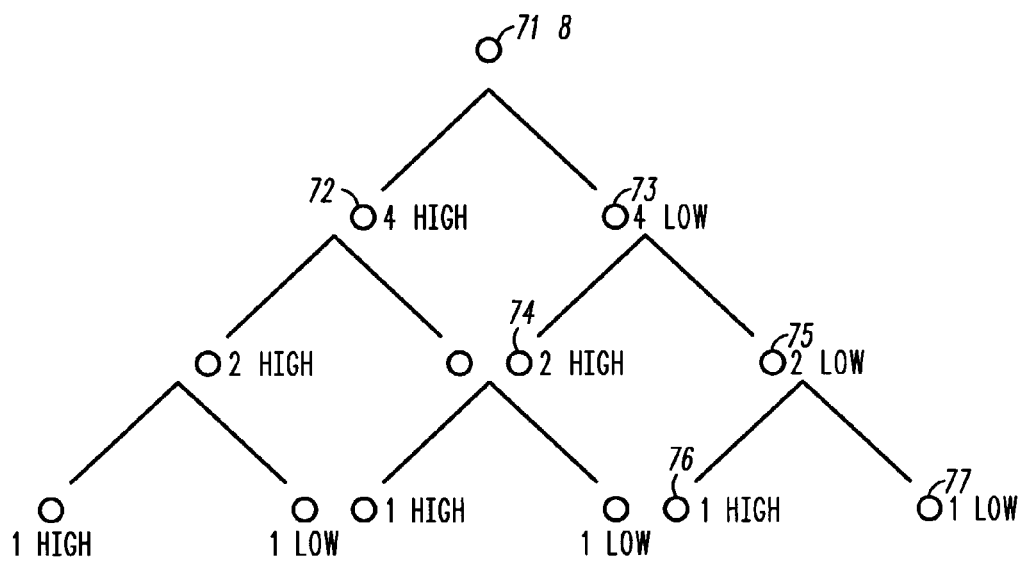
FIG. 7 comprises a schematic view of a hierarchical approach to extracting local speech recognition features as configured in accordance with an embodiment of the invention.

In one illustrative embodiment, and referring now to FIG. 6, the spectral representation is split into eight spectral bins 62. More importantly, for purposes of calculating at least some subsequent coefficients/features, these bins 62 are hierarchically split into two parts (in this embodiment, each part 63 and 64 contains an equal number of spectral bins 62). In a preferred embodiment, this hierarchical splitting of the representative spectral bins continues until only individual bins remain. For example, with momentary reference to FIG. 7, the original eight bins 71 are split in half as described above to yield a first half 72 and a second half 73 (wherein each half contains, of course, four bins). When doing this, one half 73 contains bins that represent the lower frequency content and the remaining half 72 contains bins that represent the higher frequency content. An initial coefficient can then be calculated by taking the ratio of the sum of the energies in the lower half 73 to the sum of the energies in the higher half 72. When one of the bins contains unreliable information (such as the highest frequency bin depicted in FIG. 6 where the spectral representation 61 is considerably below the ambient noise level 65), this error contribution will of course be evident to some extent in this initial calculation. Unlike various other prior art approaches, however, at least some of the subsequent processing steps will yield coefficients that are untainted by this error content, In particular, and with continued reference to FIG. 7, the two spectral halves 72 and 73 are each again halved, such that, for example, the spectral half 73 containing the lower frequency bins will itself be split into a first half 74 containing two higher frequency bins (relatively speaking) and a second half 75 containing the two lower frequency bins. A representative coefficient can again be calculated for this hierarchical point 73 by dividing the energy vector of the two lower bins 75 by the energy vectors of the two higher frequency bins 74. The resultant coefficient, it should now be appreciated, will be utterly independent of the unreliable information that is contained in the higher frequency bin 62 of the complete spectral representation. As a result, speech recognition features so derived will tend to contribute to a more reliable overall view of the audio information notwithstanding the presence of some noise in the original information.

This process is similar to a Haar transform in which energy is concentrated in localized regions. The Haar transform is a wavelet transform and can be expressed as a matrix:

$$H = \begin{bmatrix} + & + & + & + & + & + & + & + \\ + & + & + & + & - & - & - & - \\ + & + & - & - & 0 & 0 & 0 & 0 \\ 0 & 0 & 0 & 0 & + & + & - & - \\ + & - & 0 & 0 & 0 & 0 & 0 & 0 \\ 0 & 0 & + & - & 0 & 0 & 0 & 0 \\ 0 & 0 & 0 & 0 & + & - & 0 & 0 \\ 0 & 0 & 0 & 0 & 0 & 0 & + & - \end{bmatrix}$$

This matrix H can be multiplied by the eight channel energy vectors that correspond to the eight spectral bins of this example. The components that correspond to the "+" symbol are summed as $P_i$ and the components that correspond to the "−" symbol are summed as $N_i$, separately and row by row (the components multiplied by the "0" are discarded). The final feature component comprises the channel energy ratio $P_i/N_i$. If desired, and in a preferred embodiment, a monotonic nonlinear compression function (such as a logarithmic function) can be applied as well.

By providing for hierarchically split processing in this fashion, again, speech recognition features can be extracted that are not all influenced or unduly leveraged by portions of the spectral representation that suffer from unreliability. This, in turn, can lead to more reliable processing of the information and hence improved recognition results.

Referring again to FIG. 1, the extracted speech recognition features are then used to facilitate pattern matching in a pattern matching unit 19 in accordance with well understood prior art technique. (Typically, the resultant extracted features are compared against a plurality of stored feature patterns that in turn correlate to specific speech content. By identifying such previously stored patterns with the present audio information, the speech content can be "recognized.") As is known, such pattern matching is often improved when an energy value that corresponds to the audio sample is also taken into account. One known approach simply takes the average energy value across the sample and uses that resultant value (or a logarithm thereof) as this energy value. When the sample has portions that fall below a given noise level (as can be especially prevalent during non-speech portions of the audio signal), however, this approach can have the effect of treating valid signal content and noise in a relatively equal manner. As a result, the calculated energy value can be incorrectly skewed. Unduly inaccurate energy values can of course impact the reliability of the pattern matching activity described above as well understood in the art.

Figure 8:
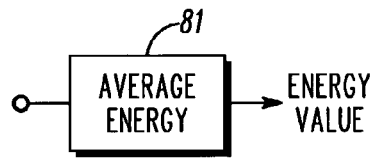
FIG. 8 comprises a block diagram as configured in accordance with another embodiment of the invention.
Figure 9:
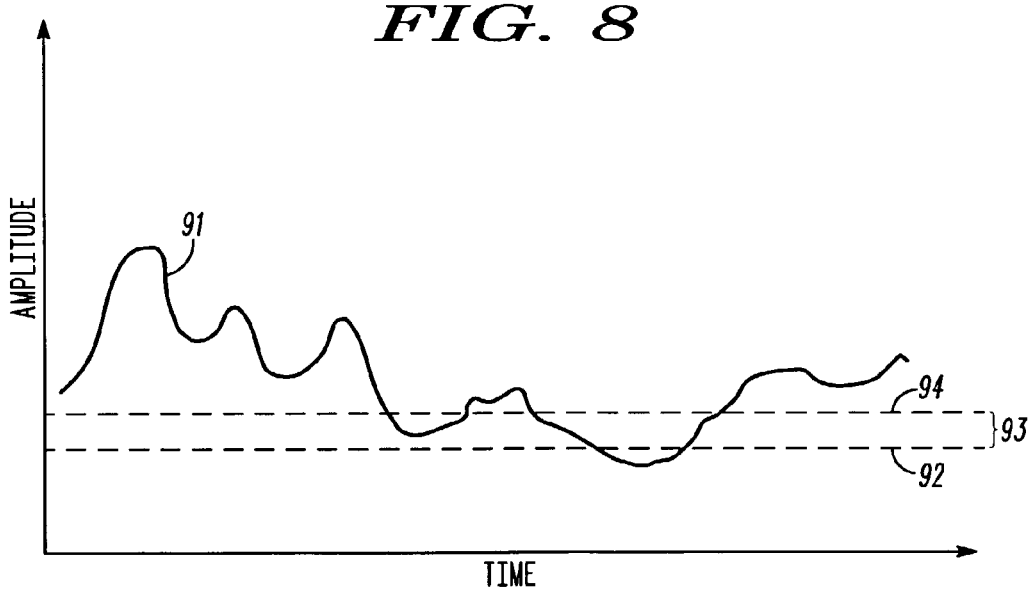
FIG. 9 comprises a graph of an audio sample as configured in accordance with an embodiment of the invention.

Therefore, in a preferred embodiment, and referring now to FIG. 8, the energy value is calculated by an average energy unit 81 that modifies the information signal energy values (when those values are less than a predetermined threshold) prior to averaging the energy values that characterize the sample. In one embodiment, the modification includes downwardly weighting or scaling the energy values that fail to meet the threshold criteria. In a preferred embodiment, and referring momentarily to FIG. 9, the threshold 94 comprises an average noise value 92 as increased by an amount 93 that corresponds to peaks in the noise content. Basically, one estimates the average energy m of the first N frames of a non-speech signal input and the upper bound M thereof. For the speech frames that follow, the energy E is then scaled by a factor of α:

$$\beta = \begin{cases} f(1-m/E)+s & \text{if } E>m \ \& \ E<M \\ s & \text{if } E<=m \\ 1 & \text{if } E>=M \end{cases}$$

where f(.) comprises a monotonically increasing function and s represents a floor value of choice as will be recognized and well understood by those skilled in the art.

So configured, noisy content (and especially non-speech interludes that are accompanied by non-speech ambient noise) can be at least partially accounted for when calculating an energy value to be used by the pattern matching unit (or any other portion of the speech recognition platform). This in turn can lead to improved recognition results.

A number of mechanisms and techniques for better facilitating speech recognition have been set forth. Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
providing information having varying amplitude in a spectral domain to be speech-recognized;
adding masking information to the provided information as a function, at least in part, of the amplitude of the provided information to provide modified information;
extracting at least some speech recognition features from the modified information by processing the modified information to obtain localized speech recognition coefficients wherein at least some of the localized speech recognition coefficients are determined independent of other of the speech recognition coefficients.

2. The method of claim 1 wherein providing information includes providing digitized information that corresponds to an original analog audio input signal.

3. The method of claim 1 wherein providing information having varying amplitude in a spectral domain includes providing information that includes harmonics, which harmonics have corresponding amplitudes that vary in the spectral domain.

4. The method of claim 1 wherein providing information includes using a fast Fourier transform.

5. The method of claim 1 wherein extracting at least some speech recognition features from the modified information comprises processing the modified information to obtain cepstral coefficients corresponding to the modified information.

6. The method of claim 1 wherein processing the modified information to obtain localized speech recognition coefficients wherein at least some of the localized speech recognition coefficients are determined independent of other of the localized speech recognition coefficients includes processing the modified information to obtain localized speech recognition coefficients wherein substantially half of the localized speech recognition coefficients are determined independent of substantially half of the localized speech recognition coefficients.

7. A method comprising:
providing information having varying amplitude in a spectral domain to be speech-recognized;
adding masking information to the provided information as a function, at least in part, of the amplitude of the provided information to provide modified information;
conditioning an average value representing energy of the provided information by downwardly scaling energy amplitude levels in a temporal domain when such energy amplitude levels fall below a predetermined threshold.

8. The method of claim 7 wherein the predetermined threshold represents, at least in part, an average noise level plus an amount that corresponds to peak noise variances.

9. The method of claim 8 wherein conditioning an average value representing energy of the provided information by downwardly scaling energy amplitude levels in a temporal domain when such energy amplitude levels fall below a predetermined threshold includes estimating average energy m of a first N frames of a non-speech signal input and an upper bound M thereof, and for at least some speech frames that follow, scaling the energy amplitude level E by a factor of β wherein:

$$\beta = \begin{cases} f(1-m/E)+s & \text{if } E>m \ \& \ E<M \\ s & \text{if } E<=m \\ 1 & \text{if } E>=M \end{cases}$$

where f(.) comprises a monotonically increasing function and s comprises a floor value.

10. The method of claim 7 wherein providing information includes providing digitized information that corresponds to an original analog audio input signal.

11. The method of claim 7 wherein providing information having varying amplitude in a spectral domain includes providing information that includes harmonics, which harmonics have corresponding amplitudes that vary in the spectral domain.

12. The method of claim 7 wherein providing information includes using a fast Fourier transform.

13. A device comprising:
an information signal input;
a spectral transformation unit having an input operably coupled to the information signal input and having an output providing a spectrally transformed information signal; and
a masking unit having an input operably coupled to the output of the spectral transformation unit and having an output providing a modified spectrally transformed information signal wherein at least some amplitude valleys are at least partially masked;
a speech recognition feature extraction unit having an input operably coupled to the output of the masking unit and having an output providing speech recognition features that correspond to an information signal as input at the information signal input and wherein the speech recognition feature extraction unit comprises a localized speech feature extraction unit having an output providing channel energy ratios that correspond to a hierarchical split of a speech spectrum that corresponds to the output of the masking unit.

14. The device of claim 13 wherein the spectral transformation unit comprises a fast Fourier transform unit.

15. The device of claim 13 wherein the speech recognition feature extraction unit comprises a cepstral coefficient extraction unit.

16. The device of claim 13 wherein the masking unit includes masking means for masking portions of the spectrally transformed information signal that correspond to substantially deep valleys as compared to adjacent peaks.

17. The device of claim 16 wherein the masking means further masks portions of the spectrally transformed information signal that correspond to substantially deep valleys as a function of at least the adjacent peaks.

18. A device comprising:
an information signal input;
a spectral transformation unit having an input operably coupled to the information signal input and having an output providing a spectrally transformed information signal; and
a masking unit having an input operably coupled to the output of the spectral transformation unit and having an output providing a modified spectrally transformed information signal wherein at least some amplitude valleys are at least partially masked;
an energy measurement unit having an input operably coupled to the information signal input and an output providing a value that corresponds to information signal energy over a period of time and that is modified to reduce portions of the information signal energy that are less than a predetermined threshold.

19. The device of claim 18 wherein the predetermined threshold corresponds to an average value of noise.

20. The device of claim 19 wherein the average value of noise is modified as a function of noise peaks.

* * * * *